United States Patent
Newell et al.

(10) Patent No.: US 7,152,107 B2
(45) Date of Patent: Dec. 19, 2006

(54) INFORMATION SHARING DEVICE

(75) Inventors: Lawrence Bert Newell, Meridian, ID (US); Gary Glen Stringham, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 826 days.

(21) Appl. No.: 10/214,234

(22) Filed: Aug. 7, 2002

(65) Prior Publication Data

US 2004/0030772 A1 Feb. 12, 2004

(51) Int. Cl.
*G06F 15/173* (2006.01)

(52) U.S. Cl. ...................... 709/224; 709/203

(58) Field of Classification Search ........... 709/213, 709/224, 230, 203, 207, 204, 202, 231, 223, 709/226; 370/389, 392, 217; 710/36, 105; 358/1.15, 1.9; 348/552, 14; 455/556; 715/709; 714/39
See application file for complete search history.

(56) References Cited

U.S. PATENT DOCUMENTS

| | | | | |
|---|---|---|---|---|
| 5,220,674 A * | 6/1993 | Morgan et al. | ............. | 709/223 |
| 5,388,196 A * | 2/1995 | Pajak et al. | ............. | 715/751 |
| 5,819,112 A * | 10/1998 | Kusters | ............. | 710/36 |
| 5,870,698 A * | 2/1999 | Riedel et al. | ............. | 702/182 |
| 6,020,973 A * | 2/2000 | Levine et al. | ............. | 358/1.15 |
| 6,083,156 A * | 7/2000 | Lisiecki | ............. | 600/301 |
| 6,108,492 A * | 8/2000 | Miyachi | ............. | 358/1.15 |
| 6,226,470 B1 * | 5/2001 | Kohtani et al. | ............. | 399/75 |
| 6,246,680 B1 * | 6/2001 | Muller et al. | ............. | 370/389 |
| 6,340,977 B1 * | 1/2002 | Lui et al. | ............. | 715/709 |
| 6,400,715 B1 * | 6/2002 | Beaudoin et al. | ............. | 370/392 |
| 6,453,071 B1 * | 9/2002 | Ito et al. | ............. | 382/232 |
| 6,453,343 B1 * | 9/2002 | Housel et al. | ............. | 709/213 |
| 6,564,274 B1 * | 5/2003 | Heath et al. | ............. | 710/105 |
| 6,606,744 B1 * | 8/2003 | Mikurak | ............. | 717/174 |
| 6,614,546 B1 * | 9/2003 | Kurozasa | ............. | 358/1.15 |
| 6,651,184 B1 * | 11/2003 | Hanes et al. | ............. | 714/5 |
| 6,654,032 B1 * | 11/2003 | Zhu et al. | ............. | 715/753 |
| 6,691,154 B1 * | 2/2004 | Zhu et al. | ............. | 709/204 |
| 6,771,381 B1 * | 8/2004 | Klein | ............. | 358/1.15 |
| 6,831,755 B1 * | 12/2004 | Narushima et al. | ............. | 358/1.9 |
| 6,895,285 B1 * | 5/2005 | Maity | ............. | 700/27 |
| 6,925,052 B1 * | 8/2005 | Reynolds et al. | ............. | 370/217 |
| 6,950,871 B1 * | 9/2005 | Honma et al. | ............. | 709/226 |
| 6,961,148 B1 * | 11/2005 | Simpson et al. | ............. | 358/1.9 |
| 7,080,041 B1 * | 7/2006 | Nagel | ............. | 705/51 |
| 2001/0047385 A1 * | 11/2001 | Tuatini | ............. | 709/203 |
| 2002/0024590 A1 * | 2/2002 | Pena | ............. | 348/14.08 |
| 2002/0060748 A1 * | 5/2002 | Aratani et al. | ............. | 348/552 |
| 2002/0065871 A1 * | 5/2002 | Wakai et al. | ............. | 709/202 |
| 2002/0069239 A1 * | 6/2002 | Katada et al. | ............. | 709/202 |

(Continued)

OTHER PUBLICATIONS

Multi-Bit Error Vulnerabilities in the Controller Area Network.—Tran (1999) www.cs.cmu.edu/~koopman/thesis/etran.ps.gz.*

(Continued)

*Primary Examiner*—Thong Vu (57) ABSTRACT

Systems and methods for information sharing are disclosed. In one embodiment, a system for information sharing includes a host device, an external device that is used in conjunction with the host device, an external bus that the host device and the external device use to communicated with each other, and an information sharing device that is connected to the external bus so as to be able to monitor communications transmitted over the external bus between the host device and the external device, the information sharing device being configured to share information about at least one of the host device and the external device with a user of those devices.

32 Claims, 6 Drawing Sheets

U.S. PATENT DOCUMENTS

| | | | |
|---|---|---|---|
| 2002/0124059 A1* | 9/2002 | Takahashi | 709/219 |
| 2002/0160350 A1* | 10/2002 | Tanaka et al. | 434/350 |
| 2002/0184376 A1* | 12/2002 | Sternagle | 709/230 |
| 2003/0028588 A1* | 2/2003 | McConnell et al. | 709/203 |
| 2003/0055952 A1* | 3/2003 | Motoyama et al. | 709/224 |
| 2003/0065805 A1* | 4/2003 | Barnes, Jr. | 709/231 |
| 2003/0217110 A1* | 11/2003 | Weiss | 709/207 |
| 2005/0007249 A1* | 1/2005 | Eryurek et al. | 340/511 |
| 2005/0235344 A1* | 10/2005 | Igarashi | 726/6 |
| 2006/0009260 A1* | 1/2006 | Takemura | 455/556.1 |

OTHER PUBLICATIONS

A Comparison of Fixed-Priority and Static Cyclic Scheduling..—Lönn, Axelsson (1999) www.ce.chalmers.se/staff/hlonn/papers/ecrts99.pdf.*

Implementation of a CAN Controller and Monitor..—Fischer, Hopfner, .. (1997) ☐☐ftp.lpr.e-technik.tu-muenchen.de/pub/papers/rtsg/sda98.ps.gz.*

Analysing Real-Time Communications: Controller Area Network (CAN)—Tindell, al. (1994) ☐☐ftp.cs.york.ac.uk/pub/ken/can8.ps.Z.*

Towards Spontaneous Interaction with the..—Leibe, Starner.. (2000) www.gvu.gatech.edu/ccg/publications/perceptive-cga-final-submission.ps.gz.*

Modeling a Copier Paper Path: A Case Study in Modeling..—Gupta, Struss (1995) ftp.icsi.berkeley.edu/pub/techreports/1995/tr-95-019.ps.gz.*

* cited by examiner

INFORMATION SHARING DEVICE

FIELD OF THE INVENTION

The present disclosure relates to information sharing. More particularly, the disclosure relates to sharing information exchanged between peripheral devices and their associated external devices and/or information obtained from external sources relevant to those devices.

BACKGROUND OF THE INVENTION

Peripheral devices are now often used in conjunction with add-on external devices. For example, printers and photocopiers are often equipped with external paper-handling devices that manage paper from an input side or output side of the peripheral device. Examples of external devices on the input side include high capacity input devices, multi-tray input devices, and the like. Examples of external devices associated with the output side include high capacity output bins, multi-tray output bins, and various document finishing devices such as stapling devices, folding devices, etc.

Such external devices typically comprise their own processing and storing capabilities and, therefore, may be thought of as comprising their own internal computers. In order to properly interact with external devices, the host device normally must be able to communicate with the external devices. Without such communication, the host device would not be able to utilize the services of the external devices. For instance, if an external paper input device is used, communications normally must occur between the host device and the input device so that the input device can be instructed as to when and the speed with which to provide paper to the host device. To cite another example, if an external stapling device is used, communications must occur to instruct the host device as to if/when the stapling device is out of staples so that output from the host can be halted until such staples are provided (or until the job is cancelled).

Some information communicated between the host device and its external devices is presented to the user on occasion. For instance, where an error condition occurs (e.g., a paper jam in an input device), this condition can be communicated to the user. Although such information is important to provide to the user and therefore serves an important purpose, this information is often sparse at best. For example, if a paper jam occurs in an external device, the user likely is only told of the condition through a terse message that identifies the condition. This can be a problem in that correcting the paper jam, or other error condition, may require several steps of which the user may not be aware and can only learn about with reference to a user's manual or skilled administrator.

The limited amount of information provided to the user may also pose a problem beyond error conditions. In particular, the user may wish to obtain more status information beyond the "ready" indication normally provided in the host device control panel. For example, an office administrator may wish to know with a relatively high degree of precision how many sheets of paper are left in an input device before sending a large job to the host device. Normally, such information is not obtainable using the host device control panel, despite the fact that this information may have been provided to the host device from the input device through their communications back and forth.

The limited nature of the information provided to the user by the host device is in part due to the programming of the host device and, at least for less expensive host devices, to the lack of display resources, most such devices merely having a one or two line character display. Although some host devices now come equipped with embedded web servers that host web pages that contain some status and/or error information, this information typically merely echoes that available using the device control panel and/or may not contain information specifically related to the external device. Although more detail could be provided using an embedded web server, not all users are interested in such information and, therefore, may not be interested in any additional cost associated with its provision. Moreover, such a solution would not permit communication of this information at the host device.

In addition to the status-type information identified above, other information that the user may wish to access is not currently provided or available to the user. For example, information as to the capabilities, such as capacity or speed, of the external devices, or the host device, normally is not provided to the user. In addition, information regarding normal use (e.g., of a tutorial nature) of the external device and/or host device typically is not provided to the user. Normally, such information regarding the devices, their capabilities, and their use is only provided in a user's manual which, unfortunately, often is difficult and tedious for most users to access.

From the above, it can be appreciated that it would be desirable for users to be able to more easily obtain a greater amount of information about external devices, or the host devices that use them.

SUMMARY OF THE INVENTION

The present disclosure relates to systems and methods for information sharing. In one embodiment, a system for information sharing comprises a host device, an external device that is used in conjunction with the host device, an external bus that the host device and the external device use to communicated with each other, and an information sharing device that is connected to the external bus so as to be able to monitor communications transmitted over the external bus between the host device and the external device, the information sharing device being configured to share information about at least one of the host device and the external device with a user of those devices.

In one embodiment, a method for information sharing comprises connecting to an external bus used by a host device and an associated external device to communicate with each other, monitoring communications between the host device and its external device, and presenting information about at least one of the host device and the external device from information obtained through the monitoring.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

As noted above, more and better information could be provided to users as to the nature and/or status of devices in a host device/external device arrangement. In that a relatively large amount of information is exchanged between the host device and its associated external devices, this information could be communicated to the user if one could "tap in" to these communications to obtain the information and present it in a manner that is more beneficial to the user.

To this end, systems and methods implementing an information sharing device are disclosed that are capable of acquiring information from communications between a host device and its associated external devices, and providing this information, and potentially other information acquired from other sources, to the user to aid the user in using the external devices, as well as the host device. As will be apparent from the following discussion, other functionalities can be obtained through provision of such a system and method. For example, information about the external devices can be provided to the host device and vice versa to facilitate their interaction and, in some cases, downloading of software/firmware updates to the devices can be facilitated.

Example systems and methods are disclosed below to describe the manner in which such information sharing can be supported. Although these embodiments are presented for purposes of discussion, it is to be understood that these embodiments are exemplary only and are not intended to limit the scope of the disclosure. Persons having ordinary skill in the art will recognize that other equivalent embodiments are feasible.

Figure 1:
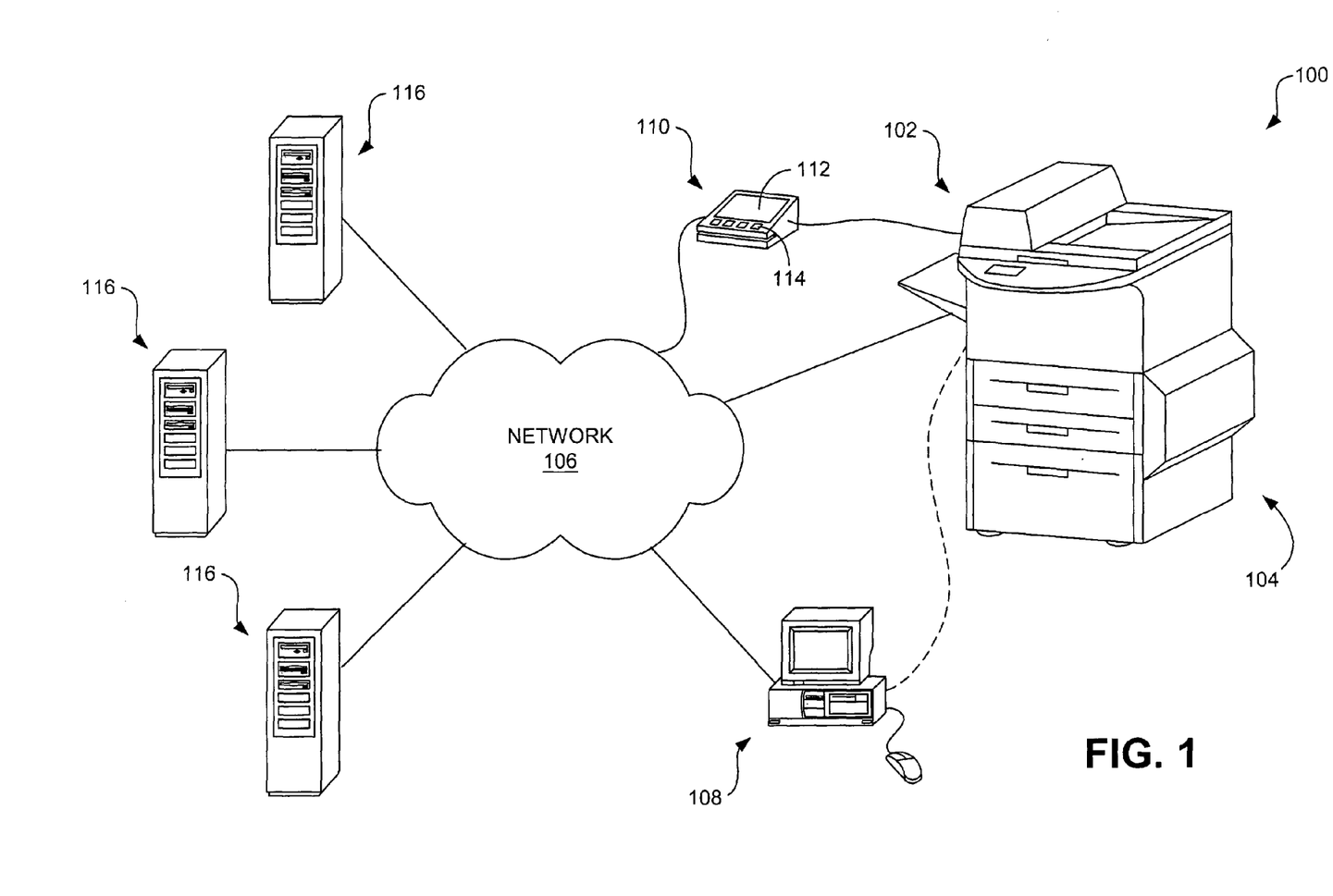
FIG. 1 is a schematic view of an example system in which information sharing can be facilitated.

Referring now in more detail to FIG. 1, illustrated is an example system 100 in which information sharing can be facilitated. As indicated in this figure, the system 100 generally comprises a host device 102 and one or more external devices 104 that are associated with the host device. Typically, the host device 102 comprises a peripheral device such as a printer, photocopier, facsimile machine, scanner, multi-function peripheral (MFP) device, or the like. In FIG. 1, the host device 102 is represented as a printer. More generally, however, the host device 102 comprises any device that is capable of using the services of an external device.

As indicated in FIG. 1, the host device 102 can, optionally, be network-enabled so as to be able to receive print jobs via a network, such as network 106. Accordingly, the host device 102 can be accessed, for instance, with a user computer 108 (e.g., personal computer (PC)). The network 106 can comprise one or more sub-networks that are communicatively coupled to each other. By way of example, these networks include one or more local area networks (LANs) and/or wide area networks (WANs). Indeed, in some embodiments, the network 106 may comprise a set of networks that forms part of the Internet. As is further depicted in FIG. 1, the host device 102 may be directly accessible by the computer 108 where the host device and computer are directly connected to each other in some manner (wired or wireless connection).

In cases in which the host device 102 comprises a peripheral device, the external devices 104 normally comprise paper-handling devices that support the host device 102 either on the input or output side of the host device. Generally, each external device 104 can comprise substantially any add-on device that assists with the completion of tasks by the host device 102. In the example shown in FIG. 1, a single external device 104 is shown and comprises a high capacity input device that provides print media (e.g., paper) to the host device 102. Other examples of external devices include multi-tray input devices, high capacity output bins, multi-tray ("mail-box" type) output bins, document finishing devices (e.g., stapling devices, folding devices), etc.

Also included in the system 100 is an information sharing device 110 that, as is discussed in greater detail below, is capable of monitoring communications that take place between the host device 102 and its external device 104. As shown in FIG. 1, the information sharing device 110 typically is provided as a separate, free-standing unit, although it will be understood that it could be integrated with (e.g., mounted to) the host device 102 if desired. Indeed, in some embodiments, the information sharing device 110 may be positioned so as to be invisible to the typical user (e.g., within the host device 102 or mounted to its back side).

For at least external applications, the information sharing device 110 can include a display 112 and/or a set of keys or buttons 114. Where provided, the display 112 can present image and/or graphical information to the user and, optionally, act as a user interface that can receive user commands. The display 112 preferably is relatively large so as to facilitate the provision of high quality information.

In some embodiments, the information sharing device 110 is connected to the network 106. As will be described in greater detail in the following, such connection facilitates the communication of information to the user as well as the retrieval of information from one or more network-accessible servers 116.

Figure 2:
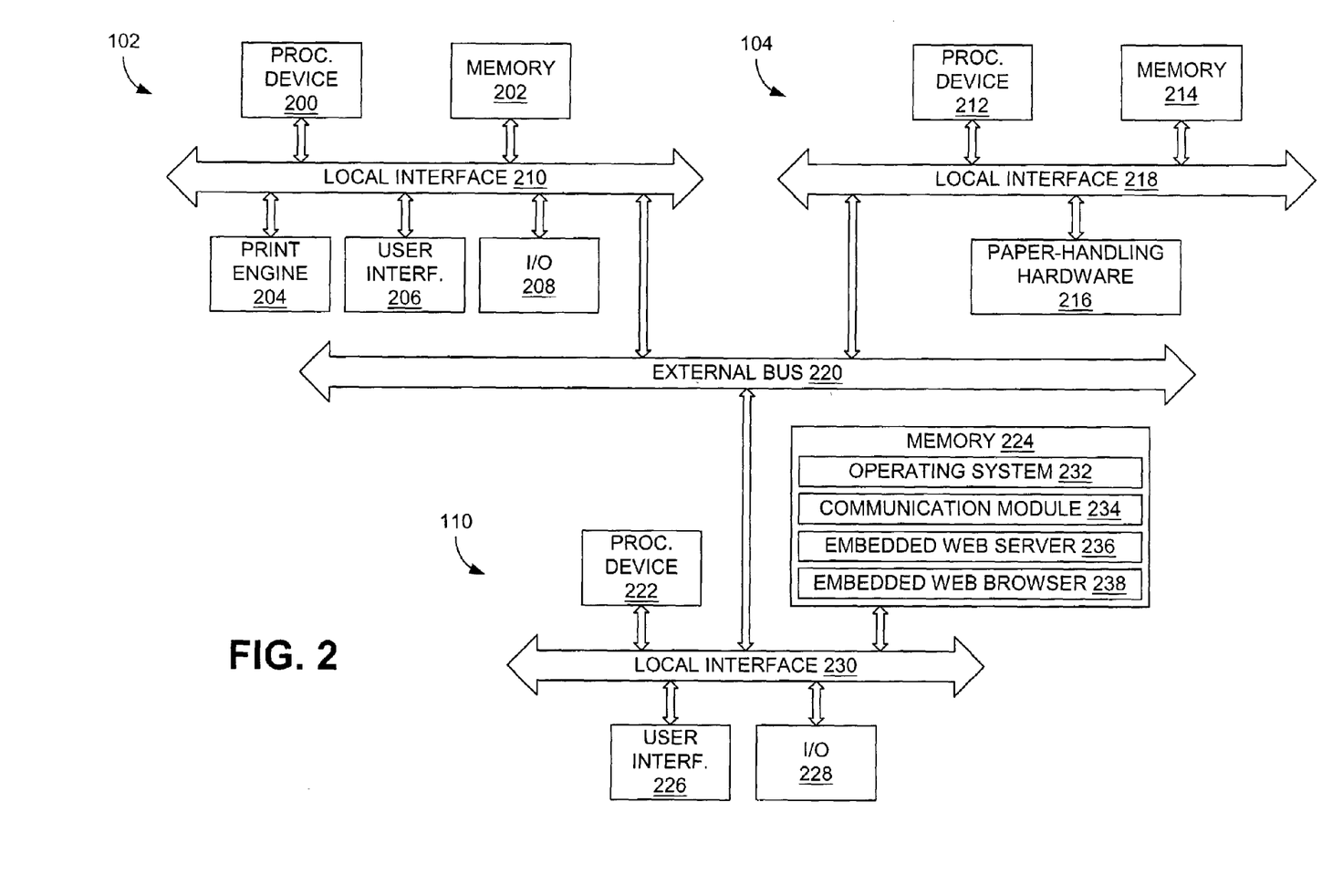
FIG. 2 is a block diagram of an information sharing device of the system shown in FIG. 1 in communication with a host device and an associated external device.

FIG. 2 is a block diagram depicting the relationship between the host device 102, the external device 104, and the information sharing device 110. As indicated in FIG. 2, the host device 102 can, for instance, comprise a processing device 200, memory 202, a print engine 204, a user interface 206, and one or more input/output (I/O) devices 208. Each of these components is connected to a local interface 210 that, by way of example, comprises one or more internal buses. The processing device 200 is adapted to execute commands stored in memory 202 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the host device 102.

The memory 202 can include any one of a combination of volatile memory elements (e.g., random access memory (RAM, such as DRAM, SRAM, etc.)) and nonvolatile memory elements (e.g., ROM, hard drive, tape, CDROM, etc.). The memory 202 includes various code (typically firmware) that controls operation of the host device 102 such as, for instance, an operating system (not identified).

The print engine 204 comprises the various components with which the host device 102 generates hard copy documents. Accordingly, the print engine 204 can comprise, for instance, a print medium drive mechanism, a photoconductor drum, a developing roller, fusing system, etc. As will be appreciated by persons having ordinary skill in the art, alternative hardware may be provided in cases in which the host device 102 is not configured for generating hard copy documents.

The user interface 206 comprises the tools with which the device settings can be changed and through which the user can communicate commands directly to the host device 102. By way of example, the interface 206 comprises a plurality of keys or buttons and a display (e.g., liquid crystal display (LCD)) that may or may not comprise a touch-sensitive screen.

The one or more I/O devices 208 comprise components used to facilitate connection of the host device 102 to other devices. These I/O devices 208 can, for instance, comprise one or more serial, parallel, small system interface (SCSI), universal serial bus (USB), IEEE 1394 (e.g., Firewire™), or personal area network (PAN) connection devices. In addition or exception, the I/O devices 208 can comprise a component used to transmit and/or receive data over the network 106. For instance, the I/O devices 208 can include a device that can communicate both inputs and outputs, for instance, a network card, modulator/demodulator (e.g., modem), a radio frequency (RF) or other transceiver, a telephonic interface, a bridge, a router, etc.

The external device 104, at least from a computing standpoint, can have a configuration similar to that of the host device 102. Accordingly, the external device 104 can include a processing device 212, a memory 214, and a local interface 218 that have configurations similar to those described above in relation to the host device 102. In addition, however, the external device 104 comprises, in this example, paper-handling hardware 216 that is adapted to manipulate paper for the host device 102 either in a supply capacity or a receiving capacity, depending upon the nature of the external device. In situations where, as in the example shown in FIG. 1, the external device 104 comprises a high capacity input device, the paper-handling hardware 216 may comprise one or more paper trays, paper feeding apparatus, and the like.

As indicated in FIG. 2, the host device 102 and the external device 104 are placed in communication with each other via an external bus 220. By way of example, this bus 220 can comprise substantially any communication path (whether wired or wireless) with which communications between two devices can be facilitated. Communications over the bus 220 can be supported using any suitable protocol. Preferred for some embodiments is the JetLink™ protocol from the Hewlett-Packard Company. As is known in the art, the JetLink™ protocol is an area network protocol facilitated by a controller area network (CAN).

Also connected to the external bus 220, so as to be able to monitor all communications on the bus, is the information sharing device 110. The configuration of the information sharing device 110 can again be similar to that of the host device 102 from a computing perspective. Therefore, the information sharing device 110 can comprise its own processing device 222, memory 224, user interface 226, I/O devices 228, and local interface 230, each of which being configured in similar manner to the like-named components of the host device 102.

As noted above in reference to FIG. 1, the user interface 226 may comprise a display and/or at least one key/button. In addition or in alternative, the user interface 226 may comprise one or more indicator lights such as light emitting diodes (LEDs). As is also noted above, the I/O devices 228 may comprise components that facilitate network communications such that the information sharing device 110 can serve information to users and communicate with, for instance, servers 116.

The memory 224 comprises various code (software and/or firmware) that is used to control information sharing device operation as well as facilitate several types of information sharing. In the example embodiment of FIG. 2, the memory 224 comprises an operating system 232, a communication module 234, an embedded web server 236, and an embedded web browser 238. The operating system 232 comprises the various commands used to control the general operation of the information sharing device 110. The communication module 234 comprises the code needed to interpret information monitored on the external bus 220 and, optionally, to transmit information on the bus using the implemented protocol. The embedded web server 234, when provided, is responsible for supporting one or more web (or other network) pages that can be accessed by the user via an appropriate browser. The embedded web browser 236, when provided, comprises the basic code to navigate a network such as the Internet in order to locate, and potentially download, various information.

Various code has been identified above. It is to be understood that this code can be stored on any computer-readable medium for use by or in connection with any computer-related system or method. In the context of this document, a computer-readable medium is an electronic, magnetic, optical, or other physical device or means that can contain or store code (e.g., in the form of a computer program) for use by or in connection with a computer-related system or method. The code can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The term "computer-readable medium" encompasses any means that can store, communicate, propagate, or transport the code for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable media include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, examples of operation of the system will now be discussed. In the discussions that follow, flow diagrams are provided. It is to be understood that any process steps or blocks in these flow diagrams may represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

As will become apparent from the following discussions, in one manner of operation the information sharing device 110 acquires information from communications that occur between the host device 102 and its external device 104 so that detailed information can be provided to the user as to device configuration, capabilities, operation, status, etc. In another manner of operation, the information sharing device 110 provides information about the external device 104 to the host device 102 and vice versa to permit the devices to interact, or more effectively interact, with each other. In yet another manner of operation, the information sharing device 110 facilitates downloading of code (e.g., firmware) to either or both of the host device 102 and the external device 104 to ensure that the most recent updates are used by the devices.

Figure 3:
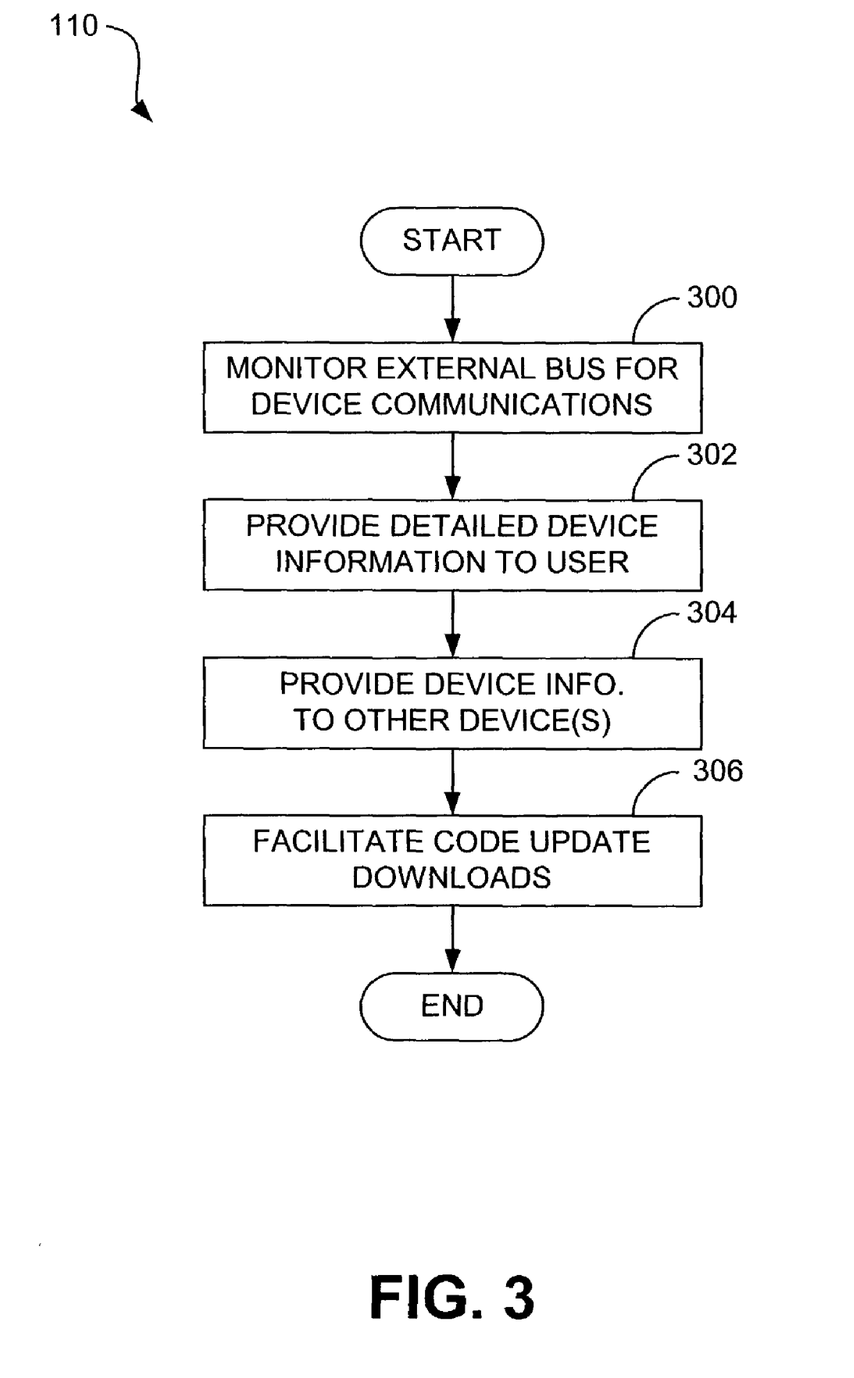
FIG. 3 is a flow diagram that illustrates an example of operation of the information sharing device of FIG. 2 in providing various forms of information.

FIG. 3 provides an overview of information sharing device operation. Beginning with block 300, the device 110 monitors communications that occur on the external bus 220 between the host device 102 and its external device 104. As is discussed below, these communications can be those that occur during device boot-up, when an error occurs, or any other time the devices "speak" to each other. By monitoring this information, the information sharing device 110 can collect the various information that it needs to, as indicated in block 302, provide information about the host or external device 102, 104 to the user. Like the information communicated over the external bus 220, this information can pertain to, for instance, device configuration, capabilities, operation, status, etc.

With reference to block 304, the information sharing device 110 can further supply device information to one or both of the host device 102 and the external device 104. In particular, the information sharing device 110 can provide information as to the operation of the external device 104 to the host device 102 that it needs to fully utilize the external device. In situations in which the external device 104 has recently been added to the host device 102, the provision of this information may occur after the first boot-up of the host device 102 after addition of the external device and may comprise information that goes beyond that typically communicated by the external device to the host device. Alternatively, similar information can be provided to the external device 104 regarding the host device 102, as necessary.

Finally, with reference to block 306, the information sharing device 110 can facilitate code downloading to either of the host device 102 and external device 104. In such a scenario, the information sharing device 110 may actively seek out new code (e.g., firmware) updates for either of the devices 102, 104 after boot-up and/or on a periodic basis, download these updates, and then deliver them to the device(s) via the external bus 220.

Figure 4A:
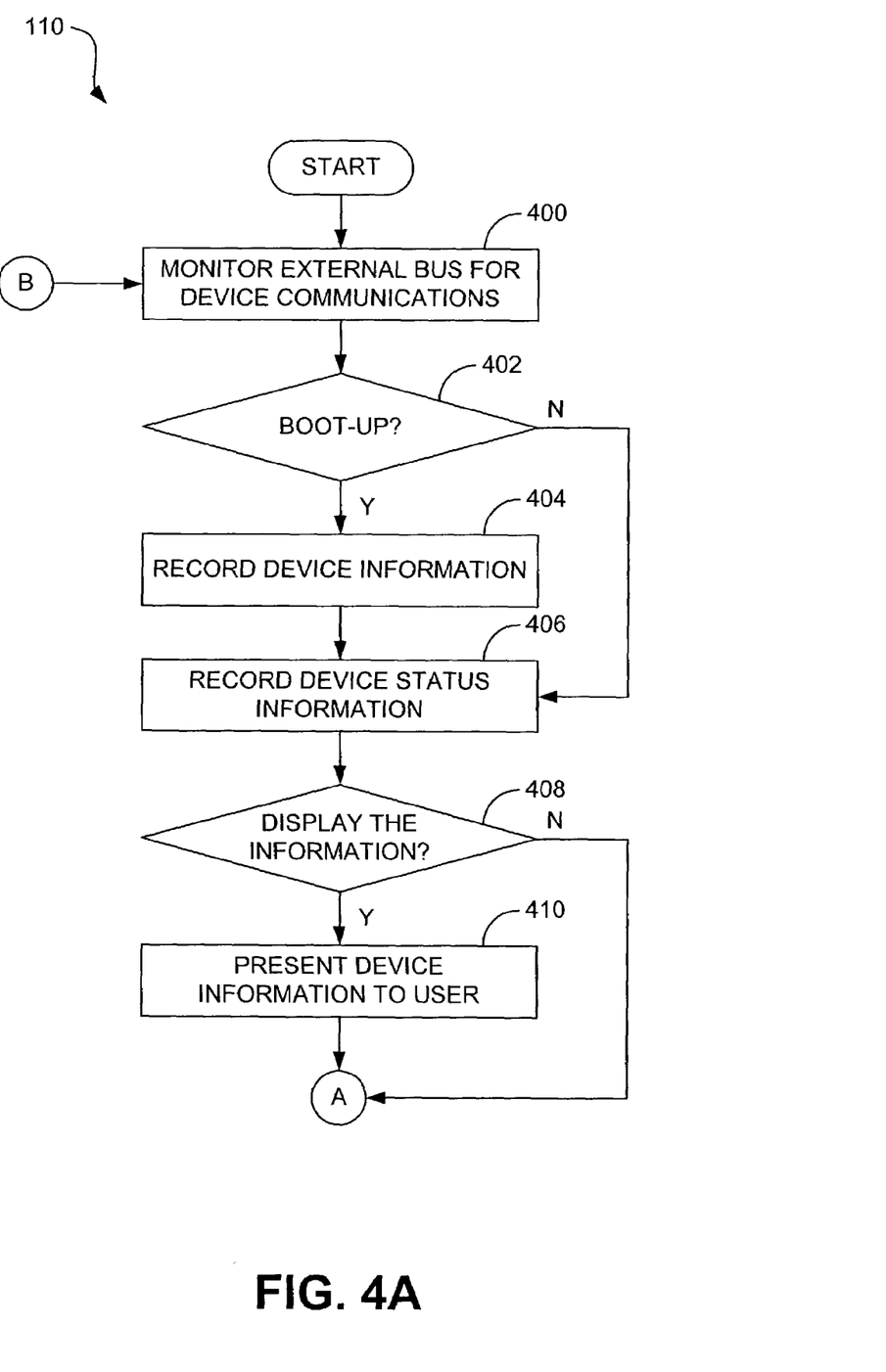
FIGS. 4A and 4B provide a flow diagram that illustrates an example of operation of the information sharing device of FIG. 2 in providing information to a user.
Figure 4B:
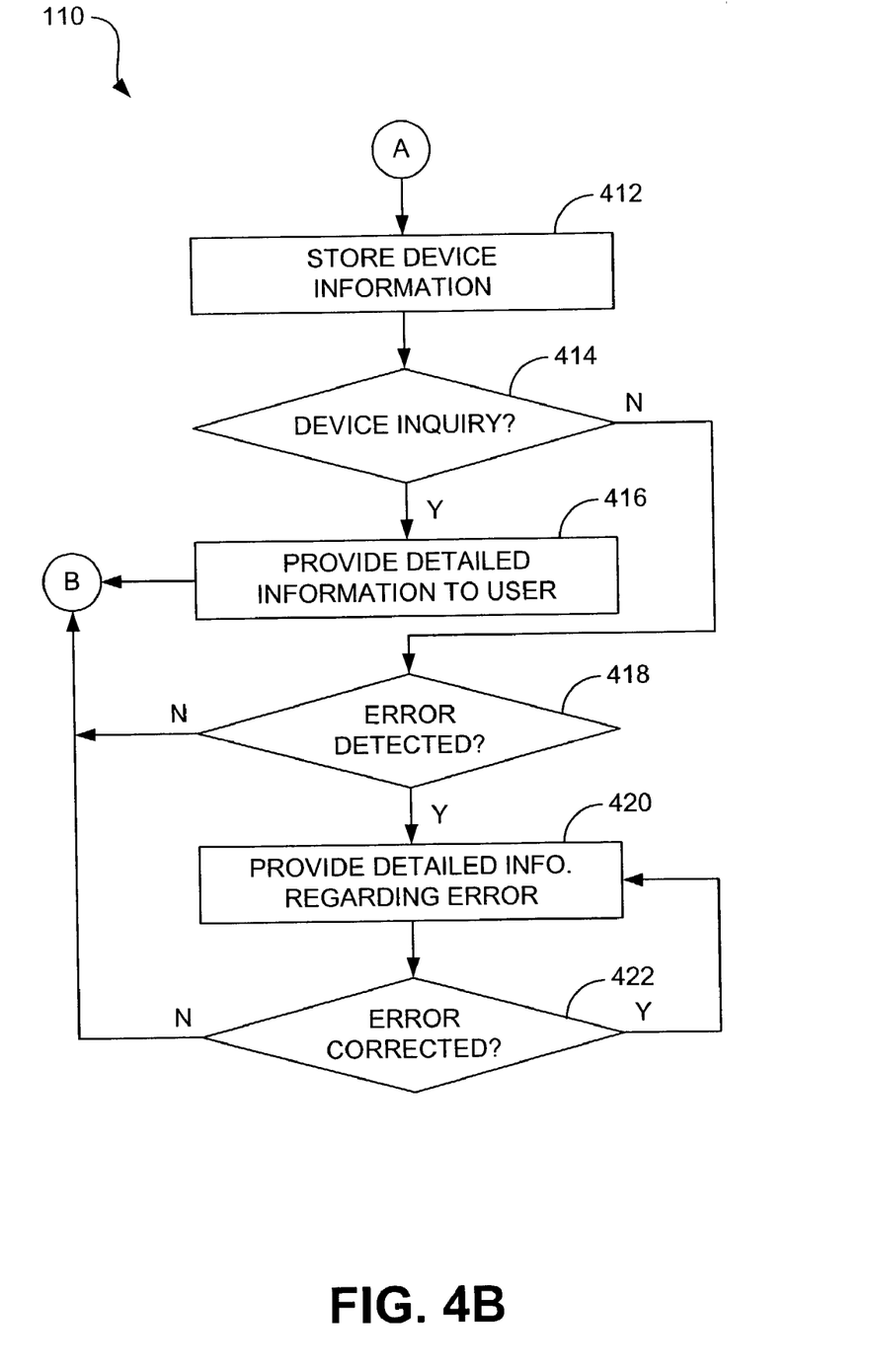

FIGS. 4A and 4B provide an example of operation of the information sharing device 110 in providing information to a user. With reference first to block 400 of FIG. 4A, the information sharing device 110 monitors the external bus 220 for communications of the host device 102 and/or the external device 104. Next, with reference to decision block 402, it can be determined whether one or both of the host device 102 and the external device 104 is booting or just booted-up. If so, the information sharing device 110 can obtain information about the devices 102, 104, and, as indicated in block 404, record it for later use. Normally, this information at least includes an identification string that describes the make and model of the device in question. In addition, the information may include information about the nature of the device's configuration, its capabilities, etc. By acquiring this information, the information sharing device 110 can "know" various details about the devices 102, 104 and their operation that normally would not be available to the user except with reference perhaps to a user's guide or manufacturer's web site. Moreover, as described below, this information can be used to accumulate other information, for example from an external source, which can be provided to the user.

If a boot-up condition is not detected, flow can instead continue to block 406 at which monitored status information regarding the devices is recorded. This information may, in some cases, be obtained from the communications that occur during boot-up. Alternatively, this information may be monitored at another time, for instance after a particular action (e.g., completion of a print job) or if a particular condition arises (e.g., toner low condition). In any case, this information can comprise information as to whether the device is prepared for use (i.e., "ready") as well as more detailed (i.e., low level) information as to device status. For example, in the case where the external device 104 is an input device, this other information may comprise the number of sheets left in a supply tray, the number of sheets input by the device in total or since having been refilled, the size of the sheets, the type of media (where the device is capable of making this determination), etc. To cite another example, if the external device 104 comprises a multi-tray output bin, the other information can comprise how many trays are available in total, how many of those trays are currently occupied, how much capacity each tray still has, etc. In yet another example, if the external device 104 is a stapling device, the other information can comprise the number of staples left, the type of staples being used, and so forth. From these examples, persons having ordinary skill in the art will appreciate the general nature of this other information and that other such information can be obtained, depending in large part on the nature of the external device.

With reference now to decision block 408, it can be determined whether to display some or all of the acquired and recorded information. This determination may depend upon whether the information sharing device 110 includes its own display. In addition or in exception, the determination may depend upon whether such a display option has been selected by the user. If it is determined to display recorded information, this information is presented to the user, as indicated in block 410. As can be appreciated from this disclosure, this information can be far more detailed than that normally provided to the user with, for example, a host device control panel display. Accordingly, this information can comprise detailed information about device configuration, capabilities, current status, etc.

Next, with reference to block 412 of FIG. 4B, the device information is stored, for instance in internal memory of the information sharing device. Referring then to block 414, it can be determined whether a user has submitted an inquiry as to the host device 102 or an external device 104. Notably, the inquiry or other request can be for information beyond typical status information and normally not accessible except in user manuals such as information as to device configuration, capabilities, operation, error conditions, troubleshooting, etc. If such an inquiry is made, detailed information relevant to the request can be provided, as indicated in block 416. For instance, the user can be provided with device capability information such as the speed of the device, the type of toner it uses, the type of media it can use, it's compatibility with other devices, etc. In addition, the user can be provided with information as to how one operates and/or maintains the device including how to use the various device features or functions, how to add paper, how to change toner, how to add staples, how to clear jams, etc. Again, persons having ordinary skill in the art will appreciate the myriad different types of information that may be requested, as well as provided.

In situations in which the information sharing device 110 includes its own display, this information can be presented in that display. In that the display is larger than those typically provided on host devices such as printers and copiers, more detailed information can be provided to the user including images and/or graphical representations of the devices 102, 104. Accordingly, more beneficial information can be communicated more easily to the user. In situations in which the information sharing device 110 also or alternatively includes an embedded web server, this information can be presented to the user with one or more web pages accessed using a suitable browser.

When a given piece of information that is requested or considered relevant to a request is not contained in communications that occur over the external bus 220 or information sharing device memory, and where the information sharing device includes an embedded web browser, the information sharing device can retrieve such information via the network 106. For example, the information sharing device 110 can be configured to, in such situations, provide an external information source (e.g., a web site of the information sharing device manufacturer or an agent thereof) with an identification string of a given device and receive a network address of a location at which further information can be obtained regarding the device in question (e.g., a web site of the external device manufacturer). With this address, the information sharing device 110 can download pertinent information and then provide it to the user with its display or via a web page. To cite a specific example, if the user wishes to know what type of staples to buy for a stapling device, the information sharing device 110 can obtain the web address (e.g., universal resource locator (URL)) for the manufacturer of the stapling device, download information as to which staples are recommended, and present the downloaded information to the user. Other such information can be obtained. For instance, provided can be instructions as to how to use the external device, information as to the graphic configuration of the device, information as to how to order consumables, advertising as to other products offered by the manufacturer, and the like. After all such information is provided to the user, flow returns to block 400 of FIG. 4A and monitoring is resumed.

With reference back to decision block 414, if no inquiry is made by the user, it can be determined whether an error condition is detected, as indicated in decision block 418. If not, flow returns to block 400 at which monitoring continues. If an error condition is detected, however, flow continues to block 420 at which detailed information about the error condition, and how to fix it, are provided to the user (again using the device display or one or more web pages). For example, the user can be provided with a detailed description of precisely where (e.g., in which bin) a paper jam has occurred and what needs to be done to remedy it. This information may be stored within information sharing device memory or can be obtained in the manner described above with reference to block 416 via the network 106. Particularly where information is obtained via the network 106, visual aids can be provided to the user including, for instance, sequential images showing a person clear a jam in a particular tray that is now jammed, step-by-step instructions including graphical representations of each step, and the like.

With reference next to decision element 422, it can be determined whether the error has been corrected. If not, flow can return to block 420 and further information provided to the user (e.g., after a given number of attempts to resume device operation or expiration of given time period). Assuming the error is corrected, however, flow returns to block 400 and monitoring is again resumed.

Figure 5:
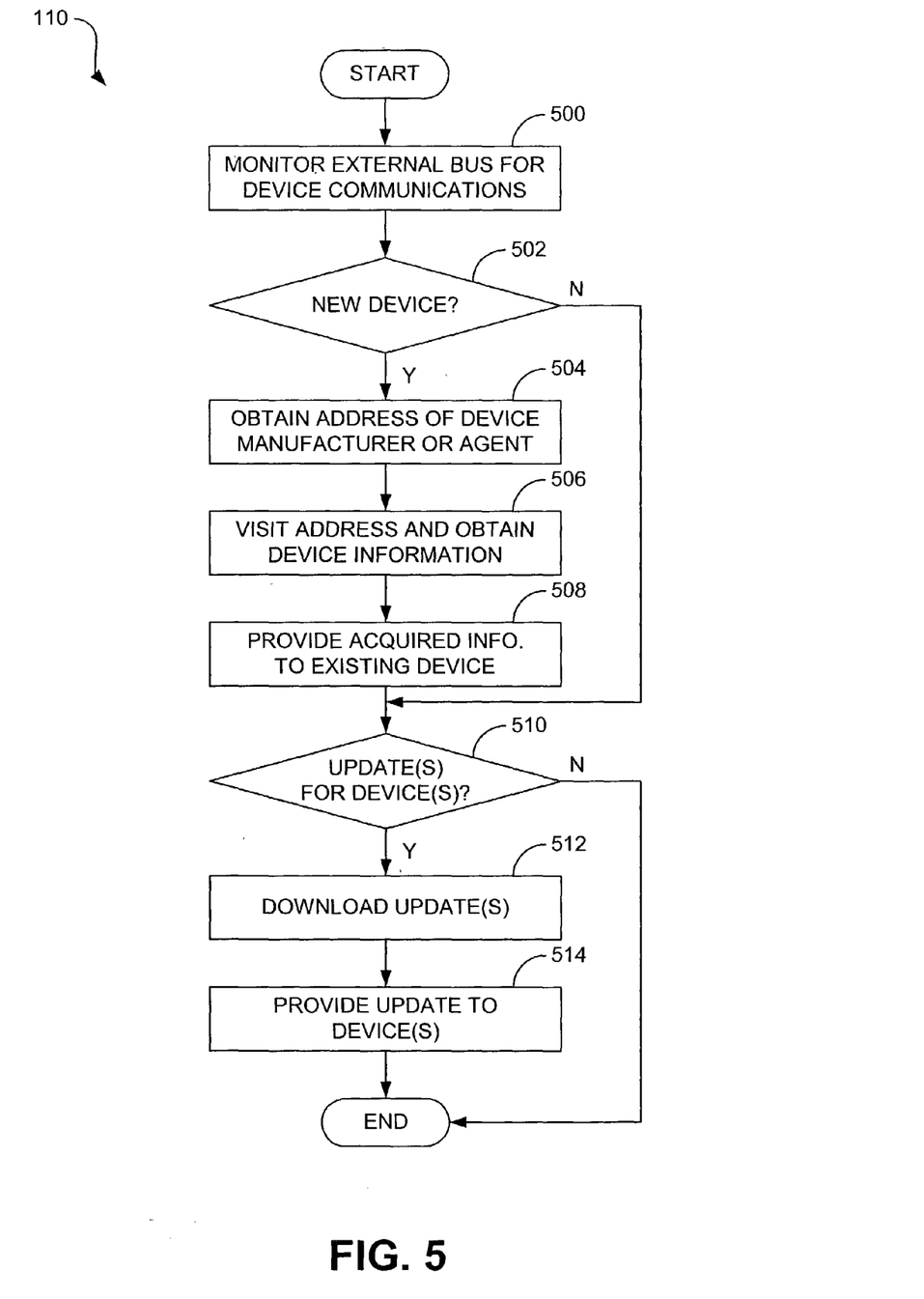
FIG. 5 is a flow diagram that illustrates an example of operation of the information sharing device of FIG. 2 in providing information to a host or external device.

FIG. 5 illustrates an example of providing information to the host device 102 and the external device 104 that helps them interact with the other device. In particular, illustrated is a method of providing information that occurs at host and/or external device start up, either during initial booting or upon "waking" from a power save state. Beginning with block 500, the information sharing device 110 monitors the external bus 220 for communications. With reference to decision block 502, it is determined whether there is a new device, whether it be an external device or the host device, that has been added to the system. If not, flow continues down to decision block 510 discussed below. If a new device is detected, however, flow continues to block 504 at which the information sharing device 110 obtains the address (e.g., URL) of the new device manufacturer (or agent thereof) in similar manner to that described above. Next, the information sharing device visits the address and obtains information regarding the new device, as indicated in block 506. Again, this information may comprise that pertaining to the device configuration, capabilities, operation, etc.

Once the information about the new device is obtained (i.e. downloaded), it is provided to the existing device, as indicated in block 508, by transmitting the information to the destination device via the external bus 220. At this point, or if no new device was detected in block 502, the information sharing device 110 can determine whether there are any code updates for the host device 102 or the external devices 104, as indicated in block 510. This determination can be made with reference to the information about the code version being used by the device obtained by monitoring bus communications in block 500 and with reference to information located at the web sites for the various devices. If there are no such updates, i.e., the devices are using the most recent code versions, flow is terminated. However, if there is/are updates, it/they are downloaded, as indicated in block 512, and the updates are provided to the respective devices, as indicated in block 514, for downloading by those devices.

As can be appreciated by the foregoing, by monitoring communications between a host device and its external devices, more detailed information can be provided to users, as well as to the devices themselves. By enabling such information sharing with separate information sharing device, those users who wish to facilitate such sharing can do so, without requiring other users to obtain, and therefore pay for, such functionality.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for providing information to a user, comprising:
connecting to an external bus used by a host printing device and an external paper-handling device connected to the host printing device to communicate with each other;
monitoring communications between the host printing device and the paper-handling device; and
presenting information about at least one of the host printing device and the paper-handling device from information obtained through the monitoring.

2. The method of claim 1, wherein monitoring communications comprises monitoring communications made in a controller area network (CAN) protocol.

3. The method of claim 1, wherein presenting information comprises presenting information in a display of a separate information sharing device that performs the monitoring.

4. The method of claim 3, wherein presenting information further includes presenting at least one of images and graphical representations of a device in the display.

5. The method of claim 1, wherein presenting information comprises presenting information in at least one web page served by an embedded web server of a separate information sharing device that performs the monitoring.

6. The method of claim 1, wherein presenting information comprises presenting detailed information regarding at least one of device configuration, device capabilities, and device status.

7. The method of claim 1, further comprising using information acquired through monitoring to obtain other information about at least one of the host printing device and the paper-handling device, and presenting the other information to the user.

8. The method of claim 7, wherein using information to obtain other information comprises using an identification string obtained through monitoring to access more information via a network.

9. A system for providing information to a user, comprising:
means for connecting to an external bus that supports communications between a host printing device and a paper-handling device connected to the host printing device;
means for monitoring communications transmitted across the external bus; and
means for presenting information obtained from the monitored communications, the information comprising information about at least one of a device configuration, capability, and status.

10. The system of claim 9, wherein the means for monitoring comprise an independent information sharing device that is separate from the host printing device and the paper-handling device.

11. The system of claim 10, wherein the means for presenting information comprise a display of the information sharing device.

12. The system of claim 10, wherein the means for presenting information comprise an embedded web server of the information sharing device.

13. The system of claim 9, further comprising means for obtaining information regarding at least one of the host printing device and the paper-handling device via a network.

14. A method for providing information to a device, comprising:
connecting to an external bus used by a host printing device and a paper-handling device connected to the host printing device to communicate with each other;
monitoring communications between the host printing device and the paper-handling device;
obtaining information about at least one of the host printing device and the paper-handling device; and
presenting information about the at least one of the host printing device and the paper-handling device taken from the obtained information to the other device.

15. The method of claim 14, wherein monitoring communications comprises monitoring communications made in a controller area network (CAN) protocol.

16. The method of claim 14, wherein obtaining information comprises obtaining information via a network using an identification string obtained during communication monitoring.

17. The method of claim 16, wherein presenting information comprises downloading the obtained information to at least one of the host printing device and the paper-handling device.

18. The method of claim 17, wherein downloading comprises downloading the obtained information via the external bus.

19. The method of claim 14, further comprising obtaining a code update for at least one of the host printing device and the paper-handling device via a network.

20. The method of claim 19, further comprising downloading the update to the at least one of the host printing device and the paper-handling device via the external bus.

21. A system, comprising:
a host printing device;
an paper-handling device that is used in conjunction with the host printing device;
an external bus that the host printing device and the paper-handling device use to communicate with each other; and
an information sharing device that is connected to the external bus so as to be able to monitor communications transmitted over the external bus between the host printing device and the paper-handling device, the information sharing device being configured to share information about at least one of the host printing device and the paper-handling device with a user of those devices.

22. The system of claim 21, wherein the information sharing device comprises a display with which information can be communicated to the user.

23. The system of claim 21, wherein the information sharing device comprises a web server with which information can be communicated to the user.

24. The system of claim 21, wherein the information sharing device comprises a web browser with which information regarding at least one of the host printing device and the paper-handling device can be retrieved.

25. An information sharing device for use with a host printing device and a connected paper-handling device, the information sharing device comprising:
a processing device; and
memory including a communication module that is configured to interpret communications transmitted over an external bus used by the host printing device and the paper-handling device to communicate with each other, the communication module facilitating monitoring of host printing device and paper-handling device communications such that information obtained from the communications can be shared with a user.

26. The device of claim 25, wherein the memory further comprises an embedded web server with which information can be communicated to the user.

27. The device of claim 25, wherein the memory further comprises a web browser with which information regarding at least one of the host printing device and the paper-handling device can be retrieved.

28. The device of claim 25, further comprising a display with which information can be communicated to the user.

29. Information sharing code stored on a computer-readable medium, the code comprising:
   logic configured to interpret communications that occur between a host printing device and a connected paper-handling device over a shared external bus; and
   logic configured to present information obtained through the interpretation.

30. The code of claim 29, further comprising logic configured to obtain additional information using the information obtained through communication monitoring, and present the additional information to the user.

31. The code of claim 29, further comprising logic configured to obtain information using the information obtained through communication monitoring, and present the information to at least one of the host printing device and paper-handling device.

32. The code of claim 29, further comprising logic configured to facilitate downloading of firmware updates to at least one of the host printing device and the paper-handling device.

* * * * *